(12) United States Patent
Mitsuru et al.

(10) Patent No.: US 8,207,917 B2
(45) Date of Patent: Jun. 26, 2012

(54) ORGANIC LIGHT EMITTING DISPLAY DEVICE AND METHOD OF DRIVING THE SAME

(75) Inventors: Fujii Mitsuru, Yongin (KR); Hae-Jin Ko, Yongin (KR); Hyung-Wook Kim, Yongin (KR); Jung-Hyun Kim, Yongin (KR); Yun-Jae Kim, Yongin (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 422 days.

(21) Appl. No.: 12/495,585

(22) Filed: Jun. 30, 2009

(65) Prior Publication Data

US 2010/0002023 A1 Jan. 7, 2010

(30) Foreign Application Priority Data

Jul. 1, 2008 (KR) .................. 10-2008-0063364

(51) Int. Cl.
*G09G 3/30* (2006.01)
(52) U.S. Cl. ............................ 345/77; 345/82
(58) Field of Classification Search .............. 345/76, 345/77, 82, 83
See application file for complete search history.

(56) References Cited

U.S. PATENT DOCUMENTS

| 6,989,636 | B2* | 1/2006 | Cok et al. ............... 315/169.3 |
| 7,432,919 | B2* | 10/2008 | Inoue et al. ............... 345/204 |
| 8,013,814 | B2* | 9/2011 | Cok et al. ............... 345/77 |
| 2003/0122759 | A1 | 7/2003 | Abe et al. |
| 2004/0263085 | A1 | 12/2004 | Chen et al. |
| 2006/0022914 | A1 | 2/2006 | Kimura et al. |
| 2007/0216611 | A1 | 9/2007 | Chang |
| 2008/0204380 | A1* | 8/2008 | Shin et al. ............... 345/80 |
| 2008/0204438 | A1* | 8/2008 | Song et al. ............... 345/207 |
| 2009/0027377 | A1* | 1/2009 | Kwon ............... 345/214 |

FOREIGN PATENT DOCUMENTS

| EP | 1 439 518 A1 | 7/2004 |
| EP | 1 763 012 A2 | 3/2007 |
| JP | 2003-5712 | 1/2003 |
| JP | 2003-162249 | 6/2003 |
| JP | 3129031 U | 2/2007 |
| JP | 2007-272144 | 10/2007 |
| JP | 2007-298936 | 11/2007 |
| JP | 2007-310097 | 11/2007 |
| KR | 10-2008-0004709 A | 1/2008 |

OTHER PUBLICATIONS

European Search Report dated Sep. 7, 2009, for corresponding European application 09251696.2, noting listed references in this IDS (except for Japan references).

(Continued)

*Primary Examiner* — Chanh Nguyen
*Assistant Examiner* — Roy Rabindranath
(74) *Attorney, Agent, or Firm* — Christie, Parker & Hale, LLP

(57) ABSTRACT

An organic light emitting display device and a driving method thereof. The organic light emitting display device includes: a display panel having scan lines, data lines and pixels; a data driver for applying correction data to the data lines; a buffer memory for storing data inputted to the pixels coupled to the scan lines; and a correction operation unit for determining a luminance degree for the pixels coupled to each of the scan lines based on the data and generating a data correction value in accordance with the luminance degree, and for providing to the data driver the correction data generated by adding/subtracting the data correction value to/from the data in accordance with positions of the pixels coupled to each of the scan lines.

9 Claims, 3 Drawing Sheets

OTHER PUBLICATIONS

KIPO Office action dated Oct. 30, 2009 for Korean Priority Application No. 10-2008-0063364, noting listed references in this IDS.

JPO Office Action dated Dec. 6, 2011, for corresponding Japanese Patent Application No. 2009-119184, 4 pages.

* cited by examiner

ORGANIC LIGHT EMITTING DISPLAY DEVICE AND METHOD OF DRIVING THE SAME

CROSS-REFERENCE TO RELATED APPLICATIONS

This application claims priority to and the benefit of Korean Patent Application No. 10-2008-0063364, filed on Jul. 1, 2008, in the Korean Intellectual Property Office, the entire content of which is incorporated herein by reference.

BACKGROUND

1. Field of the Invention

The present invention relates to an organic light emitting display device and a method of driving the same.

2. Discussion of Related Art

An organic light emitting display device is a self-illuminating device and has an improved viewing angle as compared with other display devices such as a liquid crystal display device. The organic light emitting display device has a higher light-emitting ability for its power consumption in comparison to other display devices. The organic light emitting display device can be easily manufactured to have a thickness thinner than those of other display devices.

An organic light emitting display device may be categorized into an active type and a passive type depending on the driving method.

In an active organic light emitting display device, each pixel has a driving circuit. A data signal is applied to a pixel selected through a scan line. The data signal is maintained in a capacitor during a light emitting period of the pixel. Therefore, since it is unnecessary to supply the data signal to the pixel throughout the light emitting period, the driving power of the pixel can be decreased. However, in the active organic light emitting display device, each of the pixels includes a thin film transistor and a capacitor in addition to an organic light emitting diode, and therefore, its configuration is complicated.

On the other hand, in a passive organic light emitting display device, each pixel includes an organic light emitting diode, an anode electrode and a cathode electrode, so that a light-emitting operation is performed by a data voltage or current applied between the anode and cathode electrodes. That is, the passive organic light emitting display device has a configuration relatively simpler than that of the active organic light emitting display device because it is unnecessary to provide a thin film transistor to each of the pixels, and the like. Accordingly, the passive organic light emitting display device can be easily manufactured.

A passive organic light emitting display device includes a panel unit having a plurality of pixels, scan lines through which scan signals are supplied to the pixels, and data lines through which data signals are supplied to the pixels. Particularly, the scan lines are coupled to cathode electrodes of the pixels. Generally, even-numbered and odd-numbered scan lines are alternately coupled from the left and right of the panel unit.

That is, the operation of applying a scan signal to the scan lines can be alternately performed on the left side and right side of the panel unit. As an example, the odd-numbered scan lines receive a scan signal supplied from the left side of the panel unit, and the even-numbered scan lines receive a scan signal supplied from the right side of the panel unit.

However, in the passive organic light emitting display device having such a structure, when a voltage drop (IR drop) is caused by line resistance of the scan lines, a luminance difference between pixels coupled to adjacent odd-numbered and even-numbered scan lines is increased toward both the left and right ends the panel unit. Therefore, a horizontal-stripe phenomenon may occur, thereby degrading image quality.

SUMMARY OF THE INVENTION

Accordingly, embodiments of the present invention provide a passive organic light emitting display device and a method of driving the same, wherein data inputted to data lines are corrected so as to overcome a voltage drop due to a line resistance of a scan line, so that a horizontal stripe phenomenon can be eliminated, and accordingly, degradation of image quality can be prevented or reduced.

According to an embodiment of the present invention, an organic light emitting display device includes: a display panel having scan lines including odd-numbered scan lines and even-numbered scan lines, data lines and a plurality of pixels at crossing regions of the scan lines and the data lines; a data driver for applying correction data signals to the data lines; a first scan driver for sequentially applying a scan signal to the odd-numbered scan lines; a second scan driver for sequentially applying a scan signal to the even-numbered scan lines; a buffer memory for storing data inputted to the pixels coupled to the scan lines; and a correction operation unit for determining a luminance degree for the pixels coupled to each of the scan lines based on the data and generating a data correction value corresponding to the luminance degree, and for providing to the data driver correction data generated by adding/subtracting the data correction value to/from the data in accordance with positions of the pixels coupled to each of the scan lines.

The correction operator may include a first calculator for determining the luminance degree for the pixels coupled to each of the scan lines and for calculating a luminance difference between corresponding pixels of the pixels respectively coupled to a corresponding one of the odd-numbered scan lines and a corresponding one of the even-numbered scan lines; a second calculator for receiving a result value from the first calculator and address signals of corresponding pixels of the pixels coupled to a scan line of the scan lines, and for adjusting the data correction value of the data inputted to the corresponding pixels in accordance with the positions of the corresponding pixels coupled to the scan line; and a controller for generating a revision value in accordance with luminance of the data inputted to each of the pixels corresponding to the luminance degree determined by the first calculator for each of the scan lines.

The pixels corresponding to each other with respect to each of the scan lines are pixels coupled to the same data line and respectively coupled to adjacent scan lines. The first calculator may include a circuit that sums up the data inputted to the pixels coupled to each of the scan lines so as to determine the luminance degree for the pixels coupled to each of the scan lines.

The second calculator may include a multiplication and division circuit for performing linear approximation with respect to addresses of the pixels so that the data correction values of the data are gradually adjusted in accordance with the positions of the pixels in a direction from an end to a center of the scan line. The controller may include a gray level correction table circuit having a register for storing a revision value for adding/subtracting the data correction value for each gray level of the data inputted to each of the pixels.

According to another embodiment of the present invention a driving method of an organic light emitting display device including a display panel having scan lines, data lines and pixels coupled to the scan lines and the data lines is provided. The method includes: determining a luminance degree for the pixels coupled to each of the scan lines and calculating a luminance difference between corresponding pixels of the pixels respectively coupled to corresponding adjacent scan lines of the scan lines; receiving address signals of corresponding pixels of the pixels coupled to a scan line of the scan lines, and adjusting a correction value of data inputted to the corresponding pixels in accordance with positions of the corresponding pixels coupled to the scan line; generating a revision value in accordance with luminance of the data inputted to the corresponding pixels in accordance with the determined luminance degree; and adding/subtracting the correction value to/from the data inputted to the corresponding pixels coupled to the scan line, thereby outputting correction data.

The scan lines may include an odd-numbered scan line and an even-numbered scan line adjacent to the odd-numbered scan line, and scan signals may be applied to the odd-numbered scan line and the even-numbered scan line from different ends. The correction values of the data may be gradually adjusted in accordance with the positions of the corresponding pixels in a direction from the an end to a center of the scan line.

According to still another embodiment of the present invention, an organic light emitting display device includes: a display panel having scan lines, data lines and pixels coupled to the scan lines and the data lines, the scan lines configured to alternately receive data from opposite ends; and a correction operation unit for adjusting the data to compensate for a luminance difference between corresponding pixels of the pixels respectively coupled to adjacent scan lines of the scan lines. The correction operation unit is configured to determine a luminance degree for the pixels coupled to each of the scan lines based on the data, and adjust the data in accordance with the luminance degree and positions of the pixels coupled to each of the scan lines.

As described above, according to the embodiments of the present invention, data inputted to data lines are corrected so as to overcome a voltage drop due to a line resistance of a scan line, so that a horizontal stripe phenomenon can be eliminated or reduced, and accordingly, degradation of image quality can be prevented or reduced.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF EXEMPLARY EMBODIMENTS

Figure 1:
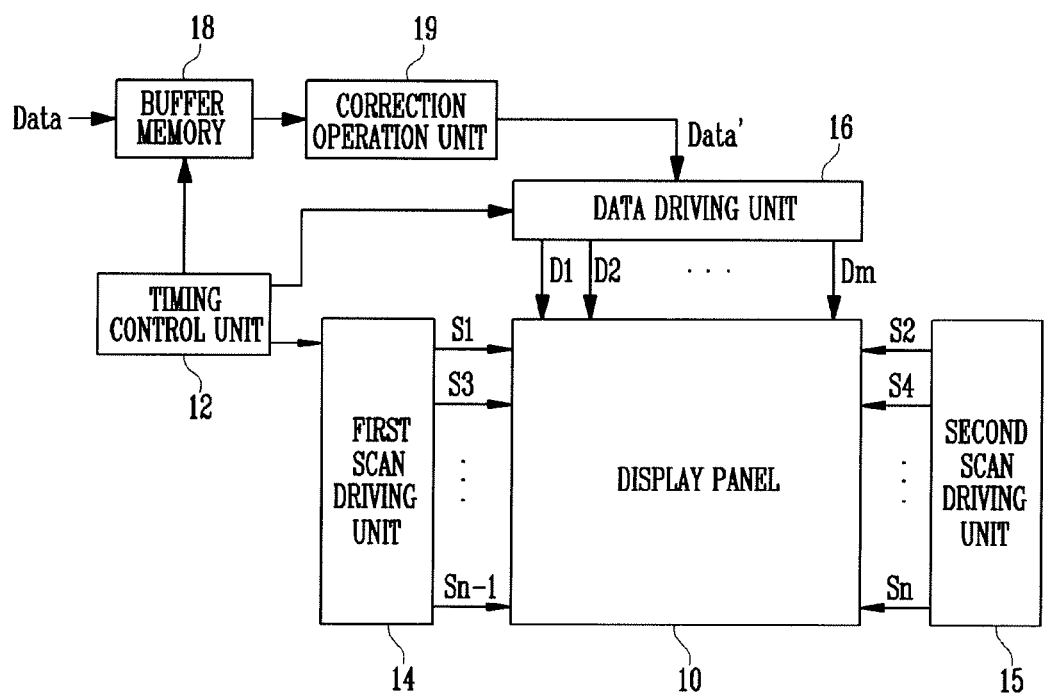
FIG. 1 is a schematic block diagram of an organic light emitting display device according to an embodiment of the present invention.

Hereinafter, certain exemplary embodiments according to the present invention will be described with reference to the accompanying drawings. Here, when a first element is described as being coupled to a second element, the first element may be directly coupled to the second element or may be indirectly coupled to the second element via a third element. Further, some of the elements that are not essential to a complete understanding of the invention are omitted for clarity. Also, like reference numerals refer to like elements throughout.

Figure 2:
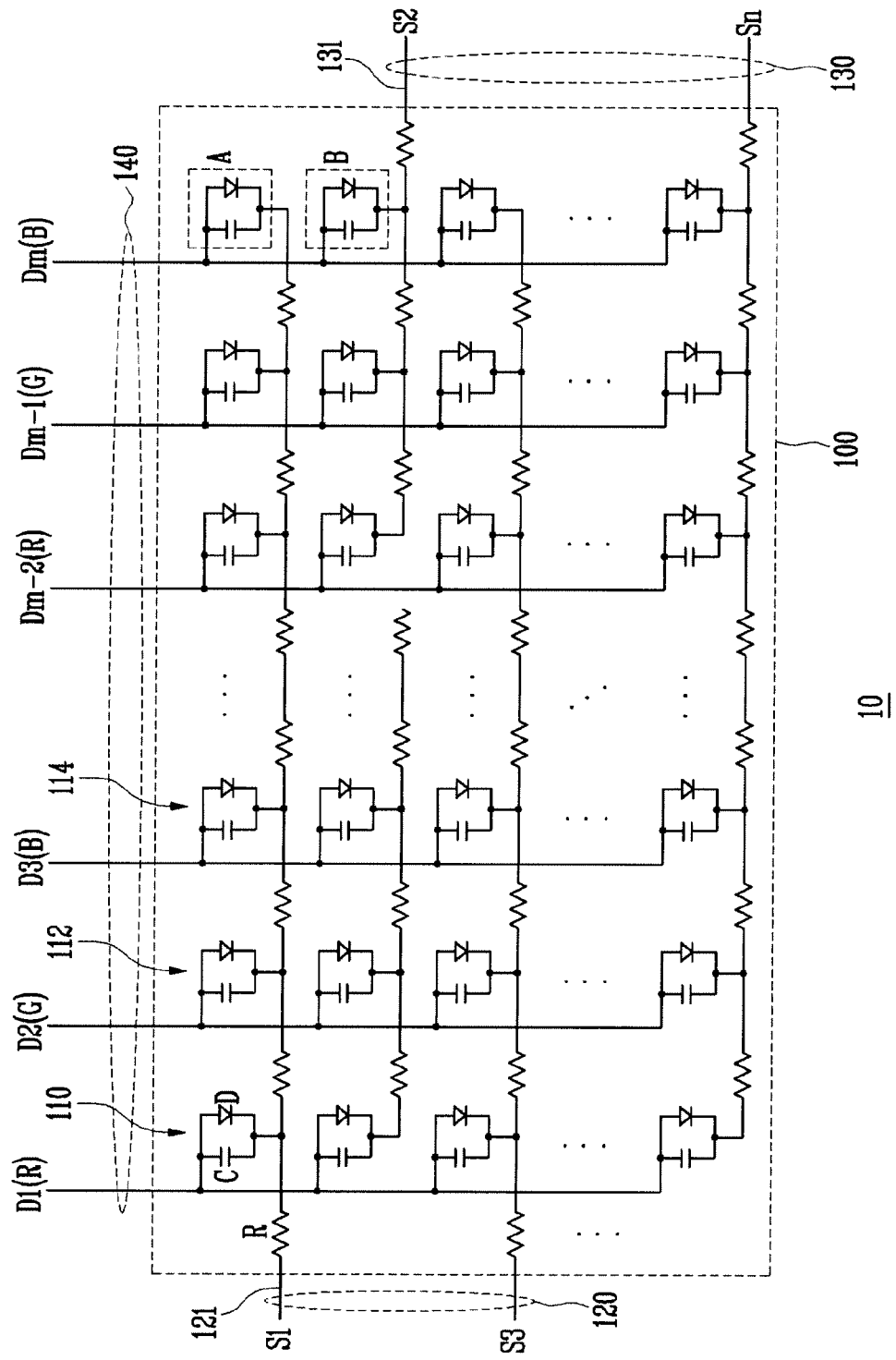
FIG. 2 is a schematic circuit diagram showing a configuration of a circuit in a display panel of FIG. 1.

FIG. 1 is a schematic block diagram of an organic light emitting display device according to an embodiment of the present invention, and FIG. 2 is a schematic circuit diagram showing a circuit configuration of a display panel of FIG. 1.

Referring to FIG. 1, the organic light emitting display device according to the embodiment of the present invention includes a display panel 10, a timing control unit 12, a first scan driving unit 14, a second scan driving unit 15, and a data driving unit 16. Further, the organic light emitting display device includes a buffer memory 18 for storing data (Data) that are inputted to pixels (not shown) coupled to scan lines S1, . . . , and Sn for each of the scan lines S1, . . . , and Sn, and a correction operation unit 19 that determines a luminance degree for pixels coupled to each of the scan lines S1, . . . , and Sn based on the data stored in the buffer memory 18 to generate a data correction value corresponding to the luminance degree, and accordingly, provides to the data driving unit 16 correction data (Data') that is generated by adding/subtracting the data correction value to/from the data (Data) to be suitable for positions of the pixels coupled to each of the scan lines.

That is, in order to overcome the effect of a voltage drop due to a line resistance of a scan line, the correction operation unit 19 corrects the data (Data) by considering a luminance degree based on the data inputted to the pixels coupled to each of the scan lines, and provides the corrected data (Data') to the data driving unit 16.

The timing control unit 12 processes externally inputted image data (Data). The timing control unit 12 controls the buffer memory 18 to which the image data is inputted, and applies data control signals and scan control signals to the data driving unit 16 and the scan driving units 14 and 15, respectively.

The data driving unit 16, which is electrically coupled to data lines D1, . . . , and Dm, generates driving currents corresponding to the correction data (Data') inputted from the correction operation unit 19 in accordance with the data control signals applied from the timing control unit 12, and applies the generated driving currents to the data lines D1, . . . , and Dm.

The scan driving units 14 and 15, which are alternately electrically coupled to the scan lines S1, . . . , and Sn, sequentially apply a scan signal to the scan lines S1, . . . , and Sn in accordance with the switching control signals inputted from the timing control unit 12.

The embodiment of the present invention shown in FIG. 1 includes the first scan driving unit 14 for sequentially applying a scan signal to odd-numbered scan lines S1, S3, . . . , and Sn−1, and the second scan driving unit 15 for sequentially applying a scan signal to even-numbered scan lines S2, S4, . . . , and Sn.

As shown in FIG. 2, the display panel 10 includes a display unit 100 having a plurality of pixels (e.g., pixels 110, 112 and 114); scan lines 120 and 130 for supplying scan signals; and data lines 140 for supplying data signals D1(R), D2(G), . . . , and Dm(B). For example, the data signals D1(R), D2(G), and D3(B) are supplied to the pixels 110, 112 and 114, respectively.

The pixels 110, 112 and 114 of the display unit 100 are formed at crossing regions of the scan lines 120 and 130 and the data lines 140, and include red pixels 110, green pixels 112 and blue pixels 114, respectively. In FIG. 2, each of the pixels 110, 112 and 114 is modeled to as having an organic light emitting diode D for emitting light in a specific color and a parasitic capacitor C. The data lines 140 are coupled to anode electrodes of the organic light emitting diodes D, and the scan lines 120 and 130 are coupled to cathode electrodes of the organic light emitting diodes D.

The scan lines 120 and 130 are coupled to the cathode electrodes of the plurality of pixels (e.g., the pixels 110, 112 and 114). When the scan lines 120 and 130 are activated (e.g., applied with a signal), the pixels 110, 112 and 114 coupled to the activated scan lines 120 and 130 are in a state in which a light emitting operation can be performed.

A display operation is categorized into an interlaced scan and a progressive scan depending on the method of activating the scan lines 120 and 130.

The operation of applying scan signals to the scan lines 120 and 130 may be alternately performed from the left side and the right side of the display unit 100. That is, the odd-numbered scan lines 120 may receive scan signals supplied from the left side of the display unit 100, and the even-numbered scan lines 130 may receive scan signals supplied from the right side of the display unit 100.

For example, when an odd-numbered line, e.g., a first scan line 121 is activated, and the data signals D1(R), D2(G), ..., and Dm(B) are supplied to the pixels (e.g., pixels 110, 112 and 114) coupled to the first scan line 121, currents passing through the pixels 110, 112 and 114 flow from the right end to the left end of the first scan line 121. Therefore, when the first scan line 121 has a line resistance that is represented by a line resistor R, a voltage at the right end of the first scan line 121 maintains a higher level than that at the left end of the first scan line 121.

That is, the cathode voltage of each of the pixels of the first scan line 121 maintains a higher level at the right end of the first scan line 121 and changes to a lower level toward the left end of the first scan line 121. Therefore, although the pixels coupled to the first scan line 121 applied with the same data should emit light of the same luminance, the pixels disposed closer to the right end of the first scan line 121 emit light of a luminance slightly lower than that of the pixels disposed closer to the left end of the first scan line 121.

The aforementioned phenomenon occurs in an opposite direction to the pixels coupled to the even-numbered scan lines 130. That is, although pixels coupled to a second scan line 131 applied with the same data should emit light of the same luminance, pixels disposed closer to the left end of the second scan line 131 emit light of a lower luminance than that of pixels disposed closer to the right end of the second scan line 131.

As such, when a voltage drop (IR drop) caused by the line resistance of a scan line occurs, a luminance difference between pixels coupled to adjacent odd-numbered and even-numbered scan lines is increased at both the left and right ends of the scan lines. Therefore, a horizontal-stripe phenomenon occurs.

More specifically, assuming that all pixels coupled to the first and second scan lines 121 and 131 are applied with data that should emit light of the same luminance, the cathode voltage ($V_A$) of the rightmost pixel A of the pixels coupled to the first scan line 121 is greater than the cathode voltage ($V_B$) of the rightmost pixel B of the pixels coupled to the second scan line 131, and the luminance of the pixel A is lower than that of the pixel B. That is, although the pixels A and B should ideally emit light of the same luminance, the pixel A emits light of a lower luminance than that of the pixel B.

In case of the pixels A and B respectively coupled to adjacent scan lines as pixels coupled to the same data line Dm, a luminance difference is caused by the voltage drop of the scan lines. The luminance difference is increased as it is moved from the center to the end of the scan lines.

That is, as a voltage difference ($\Delta V = V_A - V_B$) between the pixels A and B is increased, the luminance difference between the pixels A and B is increased.

In order to solve such a problem, there has been proposed a plan of gradually adjusting the amplitude of current applied to each of the pixels, i.e., a data, with respect to a direction of the scan lines. However, in this case, a variable voltage source should be additionally provided to adjust the amplitude of current. Further, since correction is performed at a predetermined rate regardless of the gray level of each of the data, correction for a middle gray level may not be sufficiently performed.

As an example, it is assumed that data are inputted so that all the pixels (e.g., pixels A and B) respectively coupled to the first and second scan lines 121 and 131 emit light of the luminance of 100%, i.e., the full white gray level. In this case, the pixel B emits light of a luminance of 100 cd/m$^2$, and the pixel A emits light of a luminance of 90 cd/m$^2$, which is 10% less than the luminance of 100 cd/m$_2$. Further, when the difference of cathode voltages ($\Delta V = V_A - V_B$) between the pixels A and B is zero, i.e., when data are inputted so that all the pixels A and B respectively coupled to the first and second scan lines 121 and 131 emit light of a predetermined luminance (e.g., a luminance of 50% as a middle gray level), the pixel B emits light of a luminance of 50 cd/m$^2$, and the pixel A emits light of a luminance of 40 cd/m$^2$. In this case, although the absolute value of the luminance difference is the same as the luminance difference between 90 cd/m$^2$ and 100 cd/m$^2$, but the relative luminance difference is 20%.

That is, in order to correct data to overcome the horizontal-stripe phenomenon, it is desirable to take into account a gray level degree of the data applied to each pixel in addition to the absolute value of a luminance difference between pixels respectively coupled to adjacent scan lines disposed above and below. Accordingly, the horizontal stripe phenomenon can be surely overcome in the middle gray level with a relatively large correction rate.

As described above, the organic light emitting display device according to the embodiment of the present invention includes the buffer memory 18 for storing data inputted to the pixels coupled to the scan lines for each of the scan lines, and the correction operation unit 19 that determines a luminance degree for pixels coupled each of the scan lines based on the data stored in the buffer memory 18 to generate a data correction value corresponding to the luminance degree, and accordingly, provides to the data driving unit 16 correction data generated by adding/subtracting the data correction value to/from the data to be suitable for positions of the pixels coupled to each of the scan lines, thereby overcoming the aforementioned problem.

That is, in order to overcome a voltage drop due to the line resistance of a scan line, the correction operation unit 19 corrects the data by taking into account a luminance degree based on the data inputted to the pixels coupled to the scan line, and provides the corrected data (Data') to the data driving unit 16.

Figure 3:
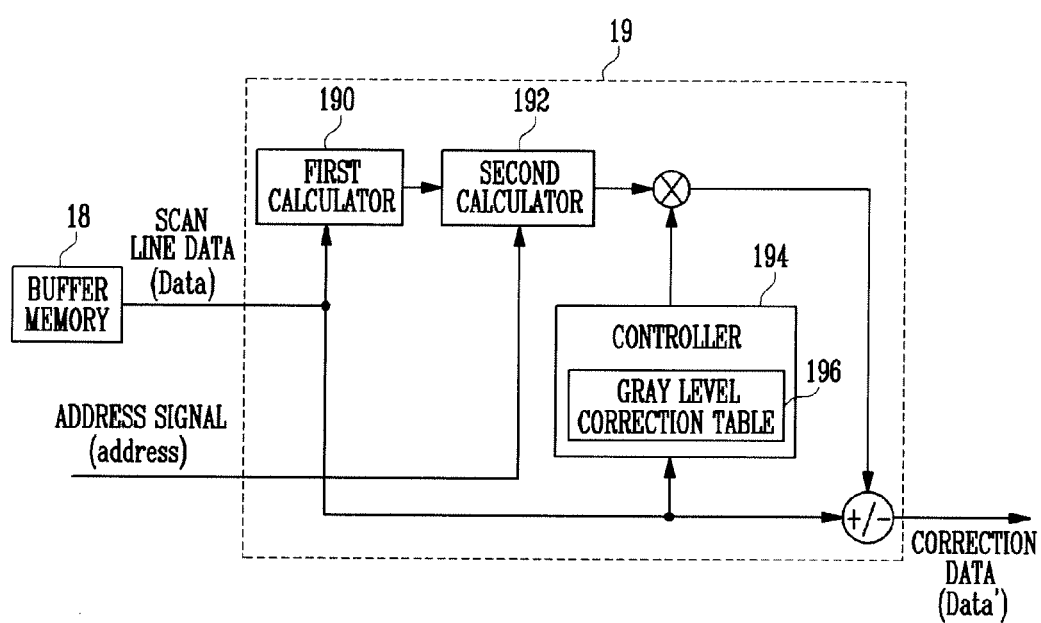
FIG. 3 is a schematic block diagram showing a detailed configuration of a correction operation unit of FIG. 1.

FIG. 3 is a schematic block diagram showing a detailed configuration of the correction operation unit 19 shown in FIG. 1.

Referring to FIG. 3, the correction operation unit 19 includes a first calculator 190, a second calculator 192 and a controller 194. The first calculator 190 determines a luminance degree for pixels coupled to each of the scan lines and calculates a luminance difference between pixels corresponding to each other with respect to each of the scan lines. The second calculator 192 receives a result value inputted from the first calculator 190 and address signals Address of pixels coupled to a scan line, and adjusts a correction value of the data (Data) inputted to the pixels to be suitable for the positions of the pixels coupled to the scan line. The controller 194 generates a revision value suitable for the luminance (gray level) of the data inputted to each of the pixels, taking into account the luminance degree determined by the first calculator 190 for each of the scan lines. Here, a final correction value generated from output values of the second calculator 192 and the controller 194 is added to or subtracted from the data (Data) inputted to the pixels coupled to each of the scan lines, thereby outputting a corrected data (Data').

As described above, the scan lines are divided into odd-numbered and even-numbered scan lines, so that scan signals are inputted from opposite directions (e.g., left and right sides) of the pixels.

The first calculator 190 receives the data (Data) inputted to the pixels coupled to the scan lines for each of the scan lines. Accordingly, the first calculator 190 determines a luminance degree for pixels coupled to each of the scan lines and calculates a luminance difference between pixels corresponding to each other with respect to each of the scan lines. As an example, a circuit that sums up the data inputted to the pixels coupled to each of the scan lines may be provided to determine a luminance degree for pixels coupled to each of the scan lines.

Alternatively, a calculator that calculates the number of pixels coupled to each of the scan lines may be provided to an organic light emitting display device driven in a pulse width modulation (PWM) mode.

Accordingly, a luminance degree of light emitted from each of the pixels coupled to the scan lines can be determined.

The second calculator 192 receives the address signals Address of the pixels coupled to a current scan line and adjusts a correction value of the data inputted to the pixels to be suitable for the positions of the pixels coupled to the scan line. As described above, a luminance difference between the pixels corresponding to each other is large at an end portion of a panel, and a luminance difference between pixels corresponding to each other is small at a central portion of the panel. Therefore, correction values of the data inputted to the pixels may be applied at different rates depending on the positions of the pixels.

Accordingly, the second calculator 192 can gradually adjust the correction values of the data in a direction from the end to the center of the scan line to be suitable for the positions of the pixels. To this end, the second calculator 192 may include a multiplication and division circuit that performs linear approximation with respect to the addresses of the pixels.

A gray level correction table circuit 196 is provided in the controller 194. The gray level correction table circuit 196 includes a register for storing a revision value for adding/subtracting a correction value for each gray level of the data inputted to each of the pixels.

That is, the controller 194 extracts a revision value suitable for a gray level of the data inputted to each of the pixels by taking into account a luminance degree obtained by the first calculator 190 for each of the scan lines.

When the controller 194 extracts the revision value for each of the pixels coupled to the scan line as described above, the revision value is multiplied by the correction value outputted from the second calculator 196, thereby generating a final correction value for each of the pixels coupled to the current scan line. The final correction value is added to or subtracted from the current data (Data) to be inputted for each of the pixels, thereby outputting a correction data (Data').

The outputted correction data (Data') is provided to the data driving unit 16 and applied to each of the pixels coupled to the scan line through the data driving unit 16.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device comprising:
 a display panel having scan lines comprising odd-numbered scan lines and even-numbered scan lines, data lines and a plurality of pixels at crossing regions of the scan lines and the data lines;
 a data driver for applying correction data signals to the data lines;
 a first scan driver for sequentially applying a scan signal to the odd-numbered scan lines;
 a second scan driver for sequentially applying a scan signal to the even-numbered scan lines;
 a buffer memory for storing data inputted to the pixels coupled to the scan lines; and
 a correction operation unit for determining a luminance degree for the pixels coupled to each of the scan lines based on the data and generating a data correction value corresponding to the luminance degree;
 wherein the correction operation unit comprises:
 a first calculator for determining the luminance degree for the pixels coupled to each of the scan lines and for calculating a luminance difference between corresponding pixels of the pixels respectively coupled to a corresponding one of the odd-numbered scan lines and a corresponding one of the even-numbered scan lines;
 a second calculator for receiving a result value from the first calculator and address signals of corresponding pixels of the pixels coupled to a scan line of the scan lines, and for adjusting the data correction value of the data inputted to the corresponding pixels in accordance with the positions of the corresponding pixels coupled to the scan line; and
 a controller for generating a revision value in accordance with luminance of the data inputted to each of the pixels corresponding to the luminance degree determined by the first calculator for each of the scan lines,
 wherein when the controller generates the revision value for each of the pixels, the revision value is multiplied by a correction value outputted from the second calculator, thereby generating a final correction value for each of the pixels coupled to the scan line, and
 said correction operating unit provides the final correction value to be added to or subtracted from the current data, thereby outputting a correction data to the data driver.

2. The organic light emitting display device as claimed in claim 1, wherein the first calculator comprises a circuit that sums up the data inputted to the pixels coupled to each of the scan lines so as to determine the luminance degree for the pixels coupled to each of the scan lines.

3. The organic light emitting display device as claimed in claim 1, wherein the second calculator comprises a multiplication and division circuit for performing linear approximation with respect to addresses of the pixels so that the data correction values of the data are gradually adjusted in accordance with the positions of the pixels in a direction from an end to a center of the scan line.

4. The organic light emitting display device as claimed in claim 1, wherein the controller comprises a gray level correction table circuit having a register for storing a revision value for adding/subtracting the data correction value for each gray level of the data inputted to each of the pixels.

5. A method of driving an organic light emitting display device comprising a display panel having scan lines, data lines and pixels coupled to the scan lines and the data lines, the method comprising:

determining a luminance degree for the pixels coupled to each of the scan lines and calculating a luminance difference between corresponding pixels of the pixels respectively coupled to corresponding adjacent scan lines of the scan lines;

receiving a result value from the calculating step and address signals of corresponding pixels of the pixels coupled to a scan line of the scan lines, and adjusting a correction value of data inputted to the corresponding pixels in accordance with positions of the corresponding pixels coupled to the scan line;

generating a revision value in accordance with luminance of the data inputted to the corresponding pixels in accordance with the determined luminance degree; and multiplying the revision value by the correction value to obtain a final correction value for each of the pixels coupled to the scan line; and adding/subtracting the final correction value to/from the data inputted to the corresponding pixels coupled to the scan line, thereby outputting correction data.

6. The method as claimed in claim 5, wherein the scan lines comprise an odd-numbered scan line and an even-numbered scan line adjacent to the odd-numbered scan line, and scan signals are applied to the odd-numbered scan line and even-numbered scan line from different ends.

7. The method as claimed in claim 5, wherein the correction values of the data are gradually adjusted in accordance with the positions of the corresponding pixels in a direction from the an end to a center of the scan line.

8. An organic light emitting display device comprising:
a display panel having scan lines comprising odd-numbered scan lines and even-numbered scan lines, data lines and pixels coupled to the scan lines and the data lines, the scan lines configured to alternately receive data from opposite ends;

a first scan driver for sequentially applying a scan signal to the odd-numbered scan lines;

a second scan driver for sequentially applying a scan signal to the even-numbered scan lines; and a correction operation unit for adjusting the data to compensate for a luminance difference between corresponding pixels of the pixels respectively coupled to adjacent scan lines of the scan lines, wherein the correction operation unit is configured to determine a luminance degree for the pixels coupled to each of the scan lines based on the data, and adjust the data in accordance with the luminance degree and positions of the pixels coupled to each of the scan lines;

wherein the correction operation unit comprises:

a first calculator for determining the luminance degree for the pixels coupled to each of the scan lines and for calculating a luminance difference between corresponding pixels of the pixels respectively coupled to corresponding adjacent scan lines of the scan lines.

a second calculator for receiving a result value from the first calculator and address signals of corresponding pixels of the pixels coupled to a scan line of the scan lines, and for adjusting the data inputted to the corresponding pixels in accordance with the positions of the corresponding pixels; and a controller for generating a revision value for adjusting luminance of the data inputted to each of the pixels in accordance with the luminance degree determined by the first calculator for each of the scan lines;

wherein when the controller generates the revision value for each of the pixels, the revision value is multiplied by a correction value outputted from the second calculator, thereby generating a final correction value for each of the pixels coupled to the scan line, and said correction operating unit provides the final correction value to be added to or subtracted from the current data, thereby outputting a correction data to the data driver.

9. The organic light emitting display device as claimed in claim 8, wherein the controller comprises a gray level correction table circuit having a register for storing the revision value for adjusting the luminance of the data for each gray level of the data inputted to each of the pixels.

* * * * *

UNITED STATES PATENT AND TRADEMARK OFFICE
CERTIFICATE OF CORRECTION

| | |
|---|---|
| PATENT NO. | : 8,207,917 B2 |
| APPLICATION NO. | : 12/495585 |
| DATED | : June 26, 2012 |
| INVENTOR(S) | : Fujii Mitsuru et al. |

It is certified that error appears in the above-identified patent and that said Letters Patent is hereby corrected as shown below:

In the Claims

Column 9, Claim 5, line 26            Delete "and"

Signed and Sealed this
Twenty-fourth Day of September, 2013

Teresa Stanek Rea
*Deputy Director of the United States Patent and Trademark Office*